J. W. DOUGLAS.
VEHICLE-WHEEL.

No. 173,601.　　　　　　　　　　　Patented Feb. 15, 1876.

Witnesses:　　　　　　　　　　Inventor:

UNITED STATES PATENT OFFICE.

JOSEPH W. DOUGLAS, OF MIDDLETOWN, CONNECTICUT.

IMPROVEMENT IN VEHICLE-WHEELS.

Specification forming part of Letters Patent No. 173,601, dated February 15, 1876; application filed May 27, 1875.

*To all whom it may concern:*

Be it known that I, JOS. W. DOUGLAS, of Middletown, county of Middlesex and State of Connecticut, have invented an Improvement in Vehicle-Wheels of ordinary construction, by which construction worn-out wheels or new ones are enabled to prolong their existence and usefulness.

The following is a full and sufficient description of the improvement, reference being had to the drawings and reference-marks thereon, making part of the description.

Vehicle-wheels generally first indicate wear at the joint of the spoke with the felly, by which the spoke-hole becomes larger and the felly becomes worn and bruised and the spoke-tenon is worn and made smaller; the tenon of the spoke becomes loose and rattles against the sides of the spoke-hole; the felly, made up of several sections, becomes loose in its joinings, and heavy blows against the tire from stones and other obstructions force the felly inward and leave a vacant space between it and the tire.

The remedy of these defects consists in packing the spoke-tenon in the spoke-hole, and the space between the tire and the periphery of the felly. The means and mode of accomplishing this work will be stated herein below.

Figure 1:
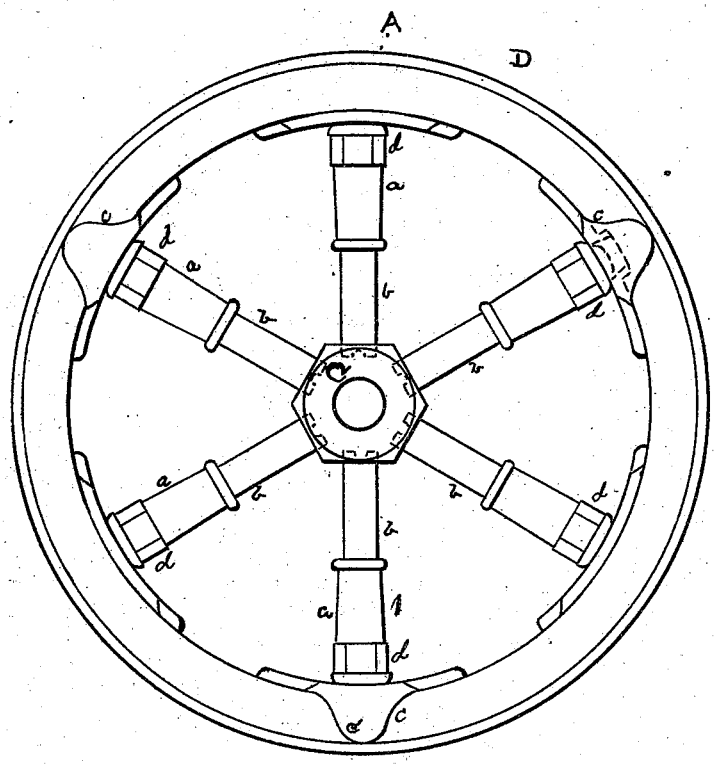
Figure 2:
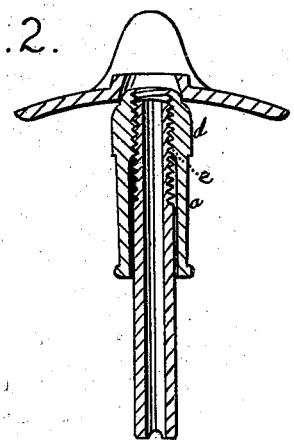
Figure 3:

In the accompanying drawings of my invention, let Figure 1 represent an end elevation of the wheel; Fig. 2, a longitudinal section of the spoke, spoke-sleeve, and cap-shield; Fig. 3, a perspective view of the crown of the cap-shield by a side and bottom view.

In the several views of the drawings the same letters and figures refer to the same parts of the wheel.

A represents the felly of the wheel, made of sections pinned together with wooden pins to form the felly or rim, having holes at equal distances apart on the inner or concave face of the felly to receive the spoke-tenons, which are cylindric. C represents the hub of the wheel; D, the tire, generally a flat metal hoop covering the felly; b, the wheel-spoke. The larger end enters the hub; the smaller cylindric end enters the spoke-hole, and originally fills it. But the wear and shrinkage together soon separate the parts of the joint. a represents the spoke-sleeve, of metal, screw-threaded on the inside to be received over and into similar screw-threads cut on the surface of the spoke, and covering its outer half. The outer part of the sleeve is rounded into a conical end, that it may enter into the spoke-hole and be screwed outward against the bottom and sides of the said spoke-hole until the felly be brought against the tire. Thus one movement packs the spoke-hole and tire and completes the work of the invention. c represents the cap shield, designed to pack the spoke-hole, and, by its brim folded backward on the sides of the felly, protects it from being split by forcing the felly outward against the tire. This thin metal lining of the spoke-hole also prevents the tenon from wearing away by friction. The brim, marked c', is not only folded back, but is fastened to the sides of the felly. e represents the screw-threads on the spoke and on the sleeve. d represents the hexagonal surface of the sleeve on the portion near the felly, for applying the wrench for screwing the sleeve toward or from the felly, as in the act of packing and unpacking the spoke-hole and the tire, as already stated above.

What I claim as my invention is—

The combination of the spoke-sleeve a and the protecting cap-shield c, substantially as specified.

JOS. W. DOUGLAS.

Witnesses:
JNO. M. DOUGLAS,
GEO. M. SMITH.